United States Patent Office 2,742,443
Patented Apr. 17, 1956

2,742,443

HIGH STRENGTH HEAT RESISTANT PLASTIC MATERIAL

Frederick W. Diggles, Topanga, Calif., assignor to North American Aviation, Inc.

No Drawing. Application July 19, 1952, Serial No. 299,911

1 Claim. (Cl. 260—17)

This invention pertains to a plastic composition and more particularly to a material usable as a cement or as a structural material.

This invention is intended to overcome certain disadvantages of presently known plastic materials of the type used for cement and of the type for use as a structural material. Present day plastic materials such as those used as a transparent cement for attachment to portions of an aircraft canopy, or used as the transparent material forming the canopy itself have certain disadvantages and limitations. When the cements harden bubbles often form within the cement. In many cases a crazing of the cement occurs after it has solidified with consequent reduction in strength of the bond. The crazing of these cements often travels from the cement itself to the canopy with which it is associated, thereby reducing the strength of the canopy also. The plastics used as cements and for the canopy materials both have insufficient resistance to high temperatures such as may be encountered as aircraft speeds increase. Often the bond of present plastic cements has insufficient strength even at low temperatures. Furthermore, it is difficult to store these plastics prior to their use and ordinary cement must be kept under refrigeration to delay its hardening which nevertheless occurs in a relatively short time.

Therefore, it is an object of this invention to provide a strong, heat resistant plastic material.

Another object of this invention is to provide a plastic material that will be free of voids and resistant to crazing.

An additional object of this invention is to provide a plastic material that is economical in cost, simple to use, and easy to store.

Yet another object of this invention is to provide a plastic material that will give a good bond when used as a cement and will have high strength as a structural material.

These and other objects will become apparent from the following detailed description.

The plastic composition of this invention comprises essentially a solution of a cellulose acetate butyrate ester in methyl methacrylate. A catalyst of methyl methacrylate may also be used to accelerate solidification of the plastic but this is not necessary. Various cellulose acetate butyrate esters may be used. Two of these esters which have been found to be particularly satisfactory are those known as type AB-381-1 and type AB-500-1 according to the designations of the Tennessee Eastman Corporation, Kingsport, Tennessee. Type AB-381-1 contains approximately 38% by weight of butyrate and the remainder of cellulose acetate. This type of cellulose acetate butyrate ester will give a particularly clear, transparent plastic product. Type AB-500-1 is comprised of approximately 50% butyrate with the remainder cellulose acetate. This type has yielded a product characterized by great strength and particularly good resistance to heat. Other cellulose acetate butyrate esters may also be used. The most desirable properties will be obtained when the cellulose acetate butyrate ester contains approximately 30% to 60% by weight of butyrate and the remainder of cellulose acetate. However, percentages of butyrate outside of this range may be successfully, if less advantageously, used.

In carrying out this invention the cellulose acetate butyrate ester is dissolved into liquid methyl methacrylate. It is desirable that the ester be in a powdered form to facilitate its entering into solution with the methyl methacrylate. The cellulose acetate butyrate in solution with the methyl methacrylate acts in some respects like a filler in the solution. The methyl methacrylate is dispersed by the cellulose acetate butyrate and extended throughout the solution. As a result the methyl methacrylate is prevented from boiling up and forming bubbles or voids as it solidifies. This produces a void free plastic material.

Various proportions of the cellulose acetate butyrate ester and methyl methacrylate may be used. It has been found that a solution containing approximately 100 parts by weight of methyl methacrylate and 22 to 25 parts by weight of AB-381-1 cellulose acetate butyrate ester produces a solution that is easy to work with and, when solidified, an end product that is very clear and possesses other desirable properties as will be more fully explained hereinafter. Approximately 27 parts by weight of AB-500-1 cellulose acetate butyrate ester mixed with 100 parts by weight of methyl methacrylate will likewise produce a very satisfactory strong plastic material. In other words, a material that has demonstrated very good properties will contain from 18% to 22% by weight of cellulose acetate butyrate ester and the remainder methyl methacrylate. However, various other proportions can be used. From 5 to 90 or even up to 200 parts by weight of the cellulose acetate butyrate ester can be used to 100 parts by weight of methyl methacrylate. The higher the percentage of cellulose acetate butyrate the greater will be the viscosity of the solution. For most uses a solution having more than 30 parts by weight of cellulose acetate butyrate to 100 parts of methyl methacrylate will be too viscous, but in some instances a very viscous liquid or even paste-like material is desired so that a higher percentage of the cellulose acetate butyrate will be required. One advantage of using the largest possible amount of cellulose acetate butyrate is that at present market prices it is considerably cheaper than the methyl methacrylate. If the amount of cellulose acetate butyrate is decreased much below 20 parts per 100 parts of methyl methacrylate the resulting material has less advantages over a pure methyl methacrylate although still having improved properties.

Normally in using this material a catalyst will be added to facilitate the setting up of the material into a solid state. Any suitable catalyst of methyl methacrylate may be used, for example, benzoin or benzoyl peroxide.

The plastic material resulting from combining materials as set forth above has several important advantages over conventional materials. As a cement it produces a strong bond, bubble free and is highly resistant to crazing. Joints secured by this cement are therefore strong and durable. The material may also be cast into sheets to provide a clear structural plastic of very good strength properties. The material has been found to be resistant to heat, maintaining its strength at much greater temperatures than other plastics of this type. In addition, it is less brittle at low temperatures than other materials. The material will also weather very satisfactorily. The liquid may be stored at room temperature for long periods of time without danger of premature hardening.

Furthermore, it is more economical to formulate than ordinary plastic materials.

The foregoing detailed description is to be clearly understood as by way of illustration and example only and is not to be taken by way of limitation, the spirit and scope of this invention being limited only by the appended claim.

I claim:

A composition of matter composed of approximately 100 parts by weight methyl methacrylate, a polymerization catalyst for said methyl methacrylate, and approximately 22 to 25 parts by weight of cellulose acetate butyrate ester, said ester being comprised of approximately 38 percent by weight butyrate and the remainder of cellulose acetate.

References Cited in the file of this patent

UNITED STATES PATENTS 2,137,377   Bauer et al. _____ Nov. 22, 1938